United States Patent
Bandera et al.

(10) Patent No.: US 9,114,562 B2
(45) Date of Patent: Aug. 25, 2015

(54) FOAMED POLYESTER EXTRUSION PROCESS AND EQUIPMENT WHICH CAN BE USED IN PLANTS FOR PRODUCING SHEETS, BOARDS OR TUBES OF FOAMED POLYESTER

(75) Inventors: Franco Bandera, Busto Arsizio (IT); Enrico Venegoni, Busto Arsizio (IT)

(73) Assignee: COSTRUZIONI MECCANICHE LUIGI BANDERA S.P.A., Busto Arsizio Va (IT)

( * ) Notice: Subject to any disclaimer, the term of this patent is extended or adjusted under 35 U.S.C. 154(b) by 996 days.

(21) Appl. No.: 13/142,906

(22) PCT Filed: Dec. 29, 2009

(86) PCT No.: PCT/IB2009/007929
§ 371 (c)(1),
(2), (4) Date: Sep. 6, 2011

(87) PCT Pub. No.: WO2010/076652
PCT Pub. Date: Jul. 8, 2010

(65) Prior Publication Data
US 2011/0306690 A1 Dec. 15, 2011

(30) Foreign Application Priority Data
Dec. 30, 2008 (IT) .............................. MI2008A2348

(51) Int. Cl.
*B29C 44/34* (2006.01)
*B29C 47/00* (2006.01)
(Continued)

(52) U.S. Cl.
CPC ......... *B29C 44/3446* (2013.01); *B29C 47/0021* (2013.01); *B29C 47/145* (2013.01);
(Continued)

(58) Field of Classification Search
CPC .................................................. B29C 44/3446
See application file for complete search history.

(56) References Cited

U.S. PATENT DOCUMENTS

| 6,369,192 B1 | 4/2002 | Dufresne et al. |
| 6,946,203 B1 | 9/2005 | Lockhart et al. |

(Continued)

FOREIGN PATENT DOCUMENTS

| CN | 1196995 | 10/1998 |
| EP | 0838318 | 4/1998 |

(Continued)

OTHER PUBLICATIONS

Main Points of the Office Action of Chinese Patent Application No. CN1196995 Filed Oct. 23, 1997.

*Primary Examiner* — Larry Thrower
(74) *Attorney, Agent, or Firm* — Notaro, Michalos & Zaccaria P.C.

(57) ABSTRACT

A foamed polyester extrusion process and equipment can be used in plants for producing sheets, boards or tubes of foamed polyester, preferably of the type operating continuously which has a thermoregulated frame provided with a feeding inlet of pure and/or recycled polyester material inside the frame. Two co-rotating screws are arranged inside the frame, the co-rotating screws defining, with the internal walls of the frame, a first degassing zone interposed between a feeding zone placed at the feeding inlet and a first tight zone. A second degassing zone is placed downstream from the first degassing zone and is separated from the latter through the first tight zone. A foaming agent inlet zone is placed downstream from the second degassing zone and is separated from the latter through a second tight zone and a pumping end zone of the melted material is placed downstream from the foaming agent inlet zone. The first degassing zone has a first vent placed at a first segment of the first degassing zone adjacent to the first tight zone, wherein the first degassing zone is adapted to carry out a forced atmospheric degassing at a temperature lower than the melting point of a treated polyester material, and the second degassing zone is adapted to carry out a vacuum degassing at a temperature equal to or greater than the melting point of the treated polyester material.

10 Claims, 4 Drawing Sheets

(51) Int. Cl.
*B29C 47/76* (2006.01)
*B29C 47/60* (2006.01)
*B29C 47/14* (2006.01)
*B29C 47/36* (2006.01)
*B29C 47/58* (2006.01)
*B29C 47/68* (2006.01)
*B29K 67/00* (2006.01)
*B29K 105/26* (2006.01)

(52) U.S. Cl.
CPC ........... *B29C47/364* (2013.01); *B29C 47/6037* (2013.01); *B29C 47/6056* (2013.01); *B29C 47/767* (2013.01); *B29C 47/367* (2013.01); *B29C 47/585* (2013.01); *B29C 47/681* (2013.01); *B29K 2067/00* (2013.01); *B29K 2105/26* (2013.01)

(56) References Cited

U.S. PATENT DOCUMENTS

| | | | |
|---|---|---|---|
| 2002/0100995 | A1* | 8/2002 | Bandera et al. ............... 264/102 |
| 2003/0155063 | A1* | 8/2003 | Ishiwatari et al. ............. 156/78 |
| 2004/0072920 | A1 | 4/2004 | Goedicke et al. |
| 2005/0159496 | A1 | 7/2005 | Bambara et al. |
| 2010/0028654 | A1 | 2/2010 | Takase et al. |

FOREIGN PATENT DOCUMENTS

| | | |
|---|---|---|
| EP | 1226922 | 7/2002 |
| EP | 1798029 | 6/2007 |
| JP | 2001-179808 | 12/1999 |
| WO | WO00/71328 | 11/2000 |
| WO | WO00/73369 | 12/2000 |
| WO | WO03/076497 | 9/2003 |
| WO | WO2004/060650 | 7/2004 |

* cited by examiner

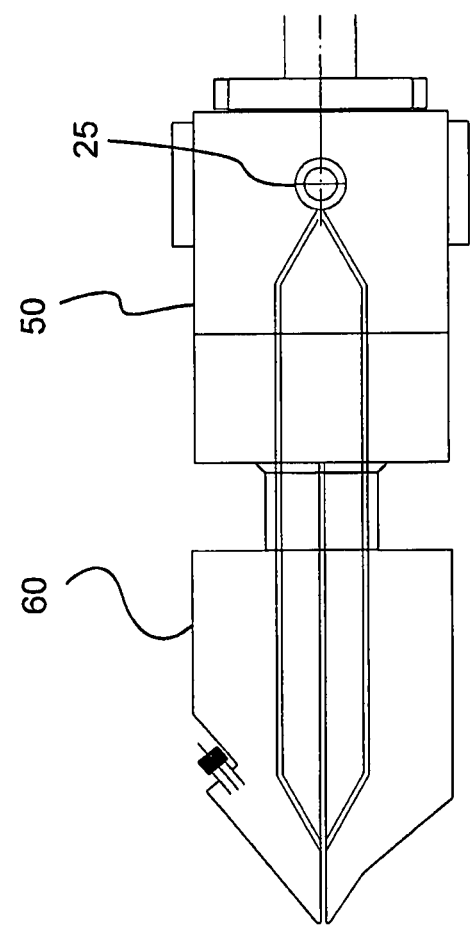

FOAMED POLYESTER EXTRUSION PROCESS AND EQUIPMENT WHICH CAN BE USED IN PLANTS FOR PRODUCING SHEETS, BOARDS OR TUBES OF FOAMED POLYESTER

The present invention refers to a foamed polyester extrusion process and equipment. In particular, the equipment according to the present invention can be used in plants for producing sheets, boards or tubes of foamed polyester, preferably of the type operating continuously. In the field of foamed polymer extrusion, plants for producing sheets or boards of foamed synthetic thermoplastic polymers, such as PS, PE, PP and PU are more common than plants used for the extrusion of foamed polyester.

This is due to the fact that the aforementioned synthetic thermoplastic polymers are materials which are characterised by a high melt strength and are very hydrophobic and thus do not undergo hydrolysis. They are thus able to maintain a sufficiently high absolute viscosity and a high melt strength which make it possible to obtain high quality foamed products and properties which are suitable for the final use in the industrial fields of packaging, coating and so on.

In particular, the high absolute viscosity and the high melt strength ensure that the gas bubbles, which are formed during the foaming step of the extrusion process, when the material is still melted, remain trapped in it without them breaking and consequently releasing gas.

Contrarily, since polyester is a highly hygroscopic material and since it is subject to strong hydrolysis, it has, if not appropriately dehumidified before the extrusion process, viscosity and melt strength properties which are insufficient in order to obtain a foamed final product having a high enough quality.

This is due to the fact that in the case in which there is humidity, during the extrusion process, and in particular when the material is in molten state, a strong hydrolysis takes place which causes the material to degrade by reducing the mechanical properties of the polyester, and in particular, the intrinsic viscosity, the absolute viscosity and the melt strength.

Such a phenomenon is particularly noticeable in the case in which post-consumption recycled materials or recycled industrial scrap and foamed or non foamed thermoforming residue, co-extruded with non foamed polyester or laminated with films of various thermoplastic materials, are used, which have low intrinsic and absolute viscosity and a particularly high initial humidity level.

In order to avoid such a phenomenon, it is known to make the polyester undergo advance drying, with the purpose of eliminating the humidity incorporated inside and outside of each granule, up to 20 parts per million. However, such a procedure is costly and obtains modest results.

Also equipment for the extrusion of foamed polyester is known which does not require the material to undergo the preliminary drying step.

Such equipment is generally made up of a twin co-rotating screw extruder connected in series to a single screw extruder, in which the twin screw extruder has the purpose of melting and mixing the pure and/or recycled polyester with some additives adapted to increase the molecular weight, and thus the viscosity and the melt strength of the polyester, and to take as much humidity as possible away from the melted material, whereas in the single screw extruder, the injection of the foaming agents, their mixing with the melted material as well as a moderate cooling of the material before the extrusion, take place.

The known equipment has the drawback of obtaining a final product having low quality due to there being no advance drying and because the humidity is only taken away when the material is already melted.

Moreover, the plant comprising both a twin screw extruder, as well as a single screw extruder causes there to be a substantial complexity with high plant costs, as well as higher energy consumption, maintenance costs and so on.

The purpose of the present invention is that of avoiding the aforementioned drawbacks and in particular that of conceiving a piece of foamed polyester extrusion equipment which is able to offer a high quality final product without requiring long and costly preventive drying processes.

Another purpose of the present invention is that of providing a piece of foamed polyester extrusion equipment which offers optimal extrusion results whilst maintaining a generally simple structure and eliminating the need for a single screw extruder placed in series.

A further purpose of the present invention is that of making a foamed polyester extrusion process that makes it possible to obtain an extrusion product having optimal properties through a substantial reduction of hydrolysis of the worked material.

These and other purposes according to the present invention are reached by making foamed polyester extrusion equipment and process as outlined in the independent claims.

Further characteristics of the foamed polyester extrusion equipment and process are object of the dependent claims.

The characteristics and the advantages of the foamed polyester extrusion equipment and process according to the present invention shall become clearer from the following description, given as an example and not for limiting purposes, with reference to the attached schematic drawings in which:

FIG. 4 is an enlarged view of a detail of FIG. 2.

Figure 1:
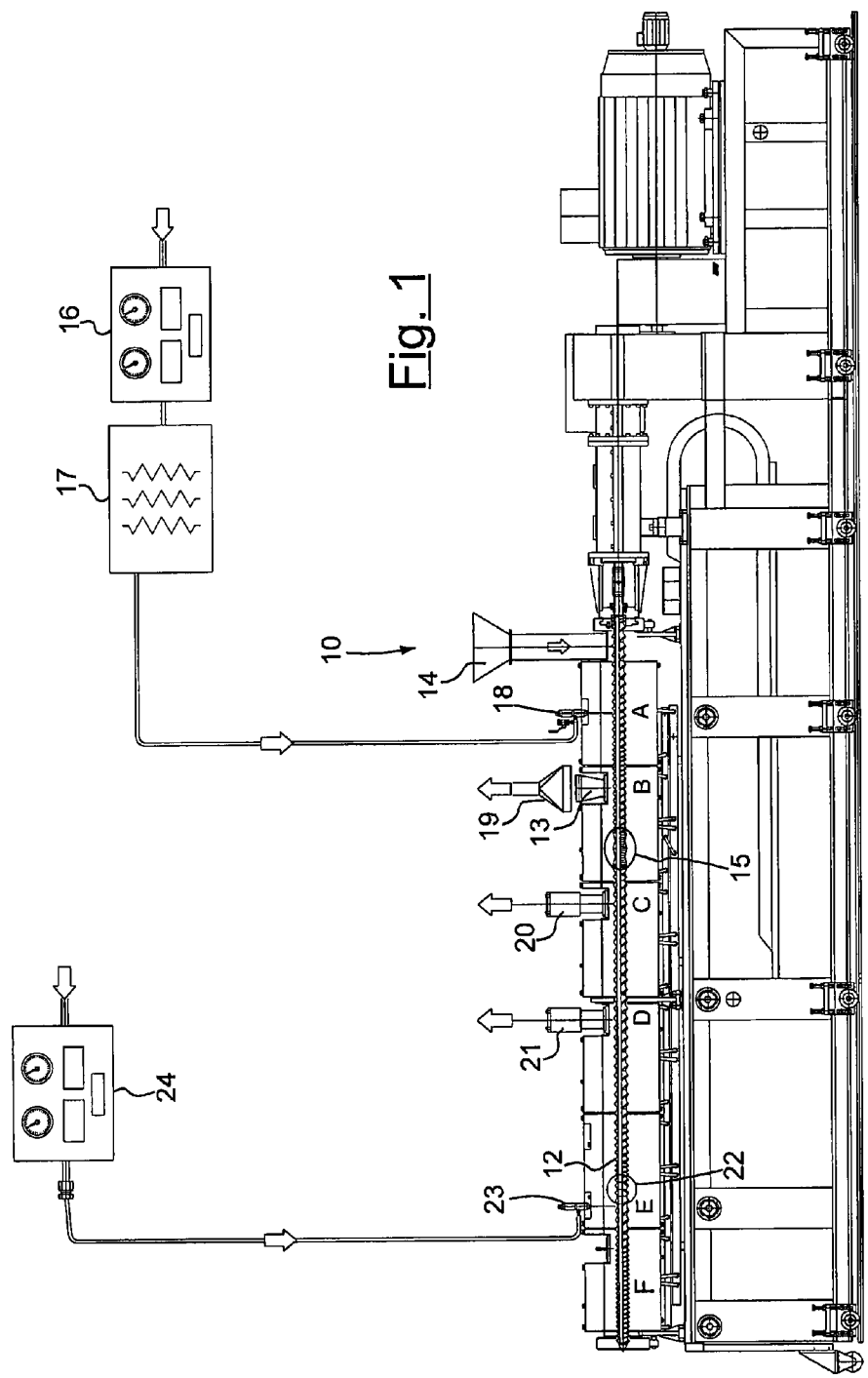
FIG. 1 is a top schematic view and partially, in section of a piece of foamed polyester extrusion equipment according to the present invention.
Figure 2:
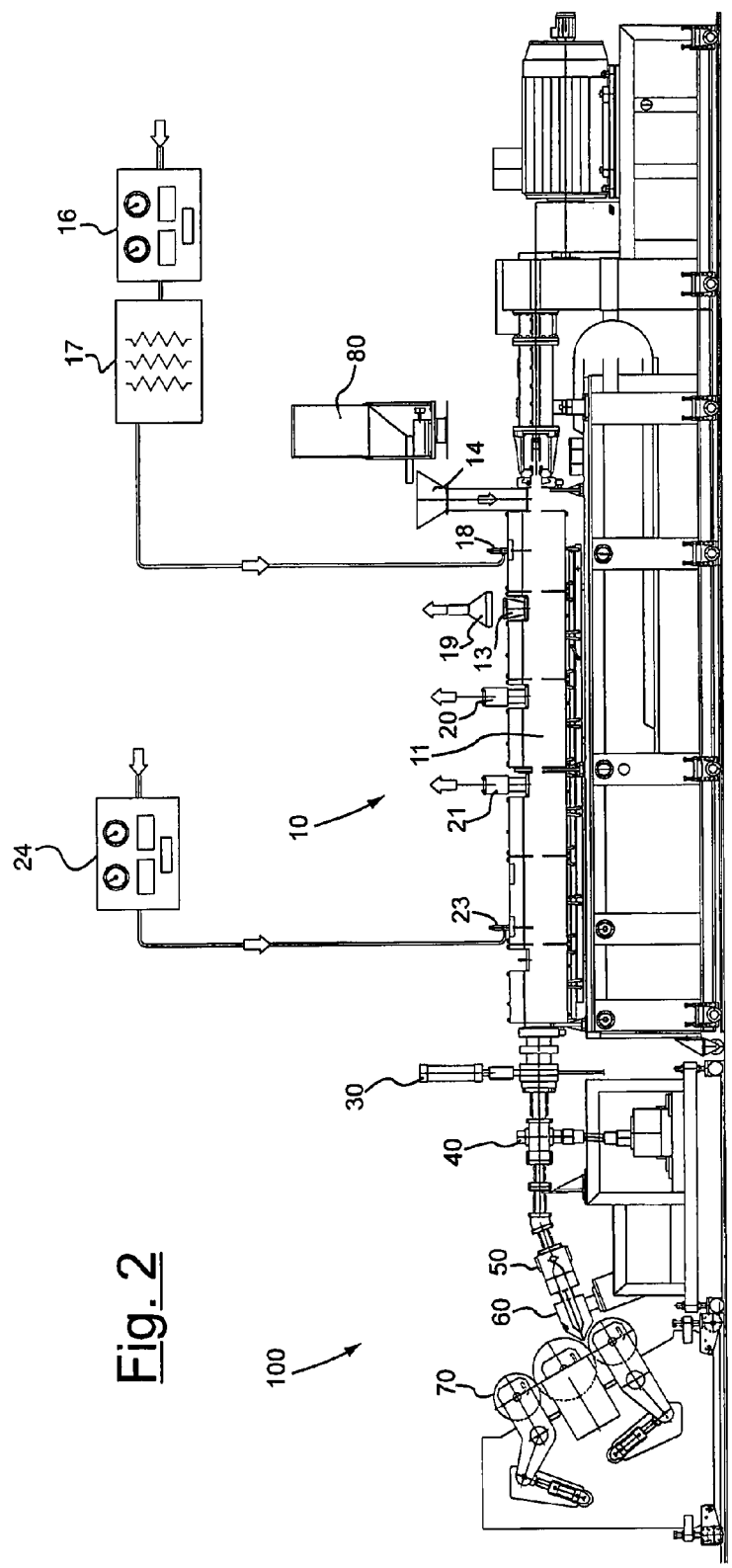
FIG. 2 is a top view of a plant for producing sheets, boards or tubes of foamed polyester using the extrusion equipment according to the present invention.

With reference to the figures, a piece of foamed polyester extrusion equipment is shown, wholly indicated with reference numeral 10.

Such equipment 10 for the extrusion of foamed polyester, hereafter in brief also called foamed polyester extruder, is used in a plant 100 for producing the sheet, board or tube in foamed polyester which also comprises, downstream from the foamed polyester extruder 10, a filter changer 30, a geared pump 40, a layering device 50, an extruder head 60, as well as a calender 70 for cooling and forming the sheet, the board or tube.

The extruder 10 for foamed polyester according to the present invention comprises a thermoregulated frame 11, for example using oil, inside which two co-rotating screws 12 are arranged, i.e., rotating in the same rotation direction, fed through a feeding inlet 14.

Preferably, the co-rotating screws 12 are of the parallel intermeshing self-cleaning type and have an L/D ratio (length over diameter) preferably of between 35 and 55, and more preferably from 42 to 52.

The dosing of the polyester material is carried out by means of a plurality of gravimetric metering devices 80, which feed a feeding inlet 14 of the foamed polyester extruder 10, by gravity.

The fed polyester material can be entirely made up of pure material, it can be a mixture of pure material and recycled material, or it can entirely be recycled material.

In the case in which recycled material is used, it is generally polyester, in particular polyethylene terephthalate (PET), in flakes from the mechanic recycling of post-consumption bottles or from the grinding of industrial scrap and thermoforming residue. The mixture generally contains foamed or non foamed material, or even material from the grinding of laminated products.

The types of mechanically recycled polyester material more frequently used are PET and PET copolymers containing moderate percentages of isophthalic acid, dietilenglicol, cyclohexanedimethanol (CHDM) and similar or polylactide (PLA) or polylactide copolymers. The dosage is very important since not only does it define the capacity of the production plant 100, but also the geometry of the screws 12 and their speed, the filling level of the screws 12 themselves in the degassing and foaming agent inlet zones of the foamed polyester extruder 10.

The feeding is preferably carried out in a way such as to obtain some screws 12 with an "open throat", i.e., not completely full of material.

In general, in addition to the gravimetric metering devices 80 which feed the foamed polyester, additional metering devices are foreseen for feeding solid additives or compounds thereof.

In general, the additives comprise chain extenders or crosslinking agents, like tetracarboxylic acid anhydrides, preferably piromellitic dianhydride (PMDA) or tri- or tetracarboxylic acids, and are used in percentages from 0.1% to about 3%, preferably from 0.1% to 0.5%, on the fed polyester.

Generally the tri- or tetracarboxylic crosslinking agents are used together with metal salts of the Groups I, II and III of the periodic table of the elements, in particular sodium and calcium carbonates, in a percentage which is similar to that of the crosslinking agent.

It is moreover possible to add nucleating agents and stabilizers of the cells of foamed material, like for example talc, to the fed polyester material. Other additives that can be fed by the gravimetric metering devices 80, are colouring agents, antiflame agents or fillers or mineral fillers like calcium carbonate and so on.

Otherwise, polyester compounds already comprising some of such solid additives are fed to the foamed polyester extruder 10, again through the gravimetric metering devices 80.

The fed material is treated between the two screws 12 so as to be made advance inside the extruder 10.

The structure of the screws 12 is such as to define, with the internal walls of the frame 11, two degassing zones separated from one another by a first tight zone 15, for example, made through a combination of cams or possibly through one or more reverse threads.

In a first degassing zone A,B arranged between the feeding inlet 14 and the first tight zone 15 the initial heating, of the polyester material fed up to a temperature lower than its melting point, and an atmospheric degassing, takes place.

In a second degassing zone C,D arranged between the first tight zone 15 and a second tight zone 22 which separates it from a zone E in which the foaming agents are introduced, a vacuum degassing takes place at temperatures higher than or equal to the melting point of the treated polyester material.

According to the present invention, the first degassing zone A,B is made in such a manner, that in it, a forced atmospheric degassing takes place whereas the temperature to which the material is brought is kept lower than the melting point of the polyester in order to keep the material in a solid state or at the maximum sintered.

For such a purpose, the atmospheric degassing zone A,B is for example provided with an extractor hood 19 arranged on top of a first vent 13 for the discharge of gas.

The extractor hood 19 is arranged away from the mouth of the first vent 13 and it can preferably be brought close to it in order to activate the draught of the vent.

The depression exerted by the extractor hood 19 is such as to have on the not yet melted material a pressure which is substantially comparable to atmospheric pressure so that there is not a removal of the still solid material.

The first vent 13 is constructed so that it promotes the draught through a suitable profile of its section which slightly but gradually decreases from the bottom upwards.

Advantageously, such a first vent 13 is positioned near to the tight zone 15, and in particular at a first segment B of the atmospheric degassing zone A,B adjacent to the tight zone 15, in which the releasing speed of the water vapours and of volatile substances is greater, since, in such a first segment B, the temperature of the material is kept at a level of around 10° C. lower than the melting point of the treated material.

By means of the forced atmospheric degassing a large amount of the humidity of the polyester material fed into the extruder 10 is taken away without preventive drying, as well as a large amount of the pollutants which often come with recycled material.

In this way the hydrolysis of the polyester material, which would otherwise be very high once reached the melting point of the polyester and higher temperatures, is minimised.

In addition or as an alternative to the provision of the extractor hood 19, the Applicant has found during the development of the forced atmospheric degassing that the effectiveness of such a degassing, in terms of hydrolysis and yellowing of the material containment, substantially increases by introducing a stream of preheated nitrogen gas into a second segment A of the first degassing zone A,B interposed between the feeding zone, placed at the feeding inlet 14, and the first segment B of the first degassing zone A,B placed at the first vent 13.

Such a flow of preheated nitrogen has an entrainment action on the vapours towards the first vent 13 which, in such a way, takes away even more of the humidity from the polyester material entraining it out through the first vent 13.

The flow rate of the nitrogen gas is regulated through a first flow regulation device 16.

For such a purpose, at the second segment A of the atmospheric degassing zone A,B, thus interposed between the feeding inlet 14 and the first vent 13, a first nozzle 18 for the inlet of nitrogen gas is preferably foreseen.

Before entering into the foamed polyester extruder 10, the nitrogen gas is heated by means of a heater 17 and subsequently introduced through such a first nozzle 18. The flow rate of the flow of nitrogen gas introduced is of between 200 l/h and 1500 l/h, and preferably between 200 l/h and 800 l/h wherein the flow rate is measured when the gas is at room temperature.

At the first tight zone 15 most of the melting of the material takes place.

The series of cams and/or the possible reverse threads of the screws 12 are full of melted material, so as to obtain the gas tight seal between the first degassing zone A,B in which the heating of the solid and the forced atmospheric degassing of the not yet melted material take place, and the second degassing zone C,D downstream from the first tight zone 15 and upstream from the second tight zone 22, in which the material completes the melting and undergoes a vacuum degassing while it mixes and reacts with the chain extender and crosslinking agents.

Preferably, the vacuum degassing takes place at a residual pressure lower than or equal to 10 mbar. Taking away the water vapours promotes the chain extender and crosslinking reactions in the melted polyester polymer.

In the example case of PET, in the second degassing zone C,D downstream from the first tight zone 15, the polyester is preferably kept at temperatures of between 280° C.÷295° C., and preferably equal to 290° C., with a relatively low level of material in the screws 12 and a high rotation speed of the latter.

Preferably, the level of material in the screws 12 in the vacuum degassing zone C,D is of between 40%÷60%, and preferably equal to 50%.

Moreover, the rotation speed of the screws 12 is preferably of between 200 rpm and 350 rpm, and more preferably of between 250 rpm÷300 rpm.

The equipment 10 for the extrusion of foamed polyester according to the present invention is thus able, in the case of PET, to obtain a measurement of the final intrinsic viscosity of the material having values of between 0.9 dl/g and 1.8 dl/g.

The vacuum degassing is carried out in the second degassing zone C,D. For such a purpose, the second degassing zone C,D has a first segment C in which a second vent 20 is provided, followed closely by a further segment D in which a third vent 21 is provided preferably connected independently to its vacuum member (not illustrated).

Such vents 20,21 define a tandem vacuum degassing since the sections C and D of the second degassing zone are not separated from one another by any tight zone.

Such an arrangement makes it possible to have a large vacuum degassing zone and thus a greater surface for the gas to be exchanged with the treated polyester material.

Moreover, the absence of intermediate tight zones between the sections C and D, intended for the vacuum degassing of the melted material, avoids the thermal degradation of the material due to local over-heating and amplifies the total length of the vacuum degassing zone obtaining in such a way a material having an overall higher final intrinsic viscosity.

The distance between the second 20 and the third 21 vent is preferably of between 8÷15 diameters, and more preferably between 10÷12 diameters.

The ratio L/D (length over diameter) of the vacuum degassing zone C,D, from the first tight zone 15 to the second tight zone 22, is preferably between 20÷33, and more preferably between 25÷30.

The second tight zone 22 is preferably obtained by inserting two reverse threads on the screws, so as to make the level of melted material rise locally until the screws 12 themselves are filled.

In this way gas interaction between the second vacuum degassing zone C,D placed upstream from the second tight zone 22 and the foaming agent inlet zone E downstream from the latter 22, is avoided.

The foaming agent inlet zone E placed downstream from the second tight zone 22 has a second nozzle 23 for introducing, in contact with the melted material, a foaming agent, preferably nitrogen gas.

In the case of nitrogen gas, the gas pressure inside the foaming agent inlet zone E is kept stable at values from 8 bar to 40 bar, preferably from 20 bar to 30 bar, by means of a second flow regulation device 24.

In these conditions, with a temperature of the melted polyester material, in the example case of PET, between 280° C. and 290° C., the absorption of nitrogen gas is equal to about 0.2%÷0.3% by weight with respect to the polyester flow rate.

Other inert gases can be used as foaming agents, in particular carbon dioxide or also other agents foaming from liquids which are easily vaporized, measured by means of a volumetric pump, for example hydrocarbons like hexane or aliphatic and aromatic hydrocarbons or also liquefied carbon dioxide.

The pumping end zone F of the extruder 10 is characterised by a very close pitch thread that promotes a progressive increase in the level of melted polymer in the screws 12 until they have been filled completely to be able to create the pressure necessary for the material to be discharged for its filtration through the filter changer 30.

Downstream from the filter changer 30 the material is fed to a gear pump 40, which provides the pressure necessary for the final extrusion through the layering device 50 and the extruder head 60.

At the outlet from the extruder head 60 the foaming of the material and the formation of the sheet take place through the calender chill roll stack 70.

In the illustrated embodiment, a flat head is indicated as an extruder head 60.

However, the head 60 can also be of the annular type, allowing a particularly effective type of cooling of the sheet.

Figure 3A:
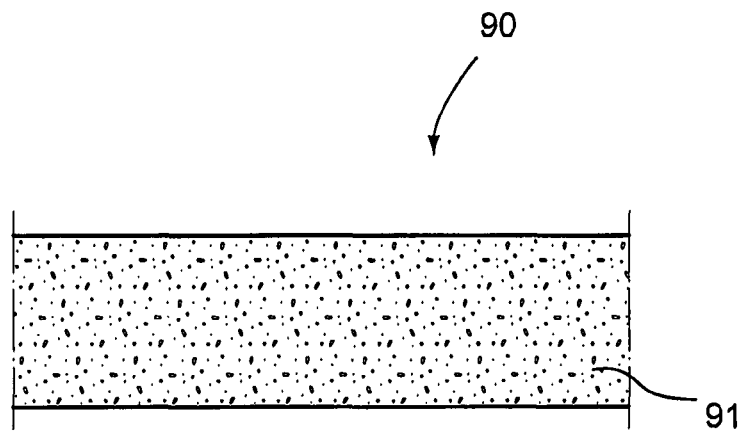
FIG. 3a is a schematic representation of a first product which can be obtained with the foamed polyester extrusion equipment and process according to the present invention.
Figure 3B:
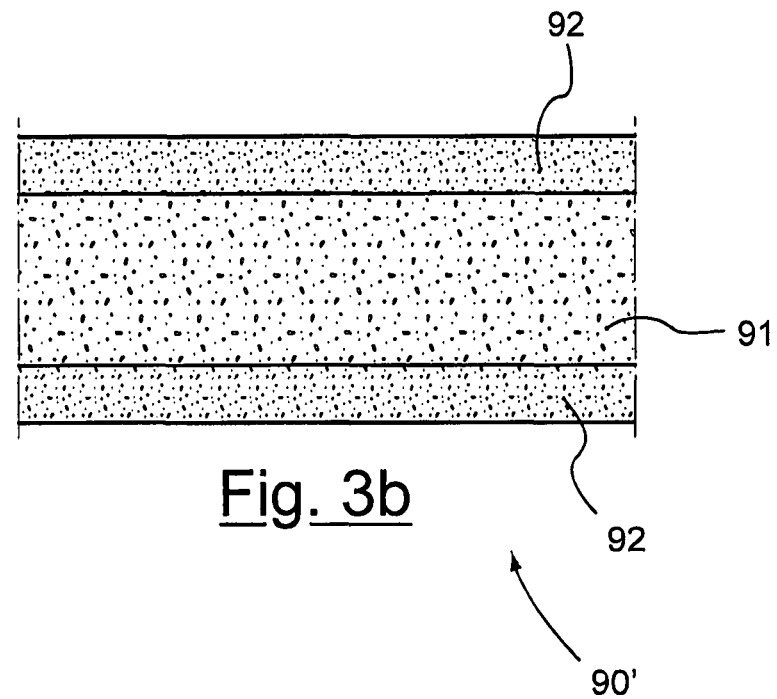
FIG. 3b is a schematic representation of a second product which can be obtained with the foamed polyester extrusion equipment and process according to the present invention.

The final product 90 can be made up of a mono-layer sheet 91, as schematised in FIG. 3a, or multi-layer, as illustrated in FIG. 3b in which a structure 90' is represented with three layers in which the layer of foamed material 91 is part of a sandwich structure with two outer layers 92 of material compatible with the foamed material 91 itself.

The multilayer structure 90' can be obtained through co-extrusion of the foamed material 91 with non foamed compatible materials fed into the layering device 50 by independent extruders (not illustrated).

In FIG. 4 the introduction into the layering device 50 of non foamed compatible material is represented with the reference numeral 25.

The lamination of the layer 91 of foamed polyester with suitable films 92, for example with polyethylene and/or other materials like for example tie-resins, is a method used to obtain structures in which the layer of foamed polyester 91 is covered on one or both sides of the non foamed material 92.

This type of lamination can be carried out during the calendering step of the foamed material or in outlet from the calender 70 or, completely separately, with or without the use of gluing compatibilizing agents.

The extrusion process of foamed polyester according to the present invention thus comprises the following steps.

Initially, a step of forced atmospheric degassing of the non pre-dried polyester material at a temperature lower than the melting point of such treated polyester material, takes place in an atmospheric degassing zone A,B.

In particular, the temperature of the polyester material during the atmospheric degassing step remains at at least 10° C. lower than its melting point.

The step of forced atmospheric degassing takes place for example, through an activation step of the draught of the first vent 13 placed at the atmospheric degassing zone A,B.

The activation of the draught of the first vent 13 can be carried out by bringing an extractor hood 19 close to the inlet of the first vent 13, said extractor hood 19 being positioned on top of the same first vent 13.

Preferably, the step of forced atmospheric degassing can in addition or as an alternative be carried out through the introduction of a flow of preheated nitrogen gas for the entrainment of the vapours towards the atmosphere.

In such a case, the preheated nitrogen gas is introduced with a flow rate d of between 200 l/h and 1500 l/h, and preferably between 200 l/h and 800 l/h wherein the flow rate is measured when the gas is at room temperature.

Subsequently the melting of the polyester material and a step of vacuum degassing of the melted material in a vacuum degassing zone C,D, comprising at least two degassing vents 20,21 connected to at least one vacuum member take place, the vacuum degassing zone C,D being arranged downstream from the atmospheric degassing zone A,B and sealingly separated from the latter A,B.

Subsequently, a step of measuring the foaming agent and its mixing with the melted polyester material takes place in a foaming agent inlet zone E placed downstream from the vacuum degassing zone C,D and sealingly separated from the latter C,D.

The foaming agent is preferably nitrogen gas and is introduced in contact with the melted material with a pressure kept stable at values from 8 bar to 40 bar, and preferably from 20 bar to 30 bar.

Finally, the feeding of the polyester material to a filter and to a gear pump take place in order to generate the pressure necessary for the final extrusion through the layering device 50 and the extruder head 60, and the foaming of the material at the outlet of the extruder head 60 as well as the forming of the sheet through the calender chill roll stack 70.

From the description carried out the characteristics of the equipment object of the present invention should be clear just as the relative advantages should also be clear.

Thanks to the particular construction of the foamed polyester extrusion equipment according to the present invention it is possible to obtain excellent quality end products even from recycled post-consumption materials without needing to previously dry the material to be treated whilst keeping the complete structure of the extruder simple.

Indeed, the forced atmospheric degassing eliminates a large amount of the water molecules present in the material before its melting takes place and thus before the hydrolysis reaction takes place at a particularly high speed.

In addition, the particular configuration of the vacuum degassing zone makes it possible to reduce the thermal degradation suffered by the material while passing in the extruder, as well as to optimise the mixing and the rapid reaction with the chain-extender and crosslinking agents.

Overall, a material is obtained, having a greater intrinsic and absolute viscosity and a higher degree of melt strength that is able to keep the bubbles of gas, which are formed during the foaming step, trapped inside the material still melted without them breaking and consequently releasing gas.

Finally, it should be clear, that the equipment thus conceived can undergo numerous modifications and variants, all covered by the invention; moreover, all the details can be replaced by technically equivalent elements. In practice the materials used, as well as the sizes, can be any according to the technical requirements.

The invention claimed is:

1. A foamed polyester extrusion process, comprising the steps of:
   a) feeding a mixture of non pre-dried polyester material into a foamed polyester extrusion equipment;
   b) heating said polyester material by bringing it to a temperature lower than its melting point;
   c) performing a forced atmospheric degassing of said heated polyester material in an atmospheric degassing zone by employing an extractor hood to activate the draught of a vent stack placed at a segment of said atmospheric degassing zone adjacent to a tight zone, said extractor hood being arranged on top of said vent stack for the discharge of gas from said atmospheric degassing zone, the forced atmospheric degassing being performed by introducing a preheated nitrogen gas flow for the entrainment of vapors towards the atmosphere;
   d) bringing said polyester material to a temperature greater than or equal to its melting point;
   e) performing a vacuum degassing of said melted material in a vacuum degassing zone arranged downstream from said atmospheric degassing zone and sealingly separated from the latter;
   f) lowering the temperature of said polyester material and introducing, in contact with it, at least one foaming agent at a foaming agent inlet zone placed downstream from said vacuum degassing zone and sealingly separated from the latter; and
   g) increasing the pressure of said material in order to be able to expel it at a pumping end zone placed downstream from said foaming agent inlet zone.

2. The foamed polyester extrusion process according to claim 1, wherein the temperature to which the polyester material is brought in order to be able to perform the forced atmospheric degassing is at least 10° C. lower than its melting point.

3. The foamed polyester extrusion process according to claim 1, wherein the forced atmospheric degassing is performed by using an extractor hood adapted to activate the draught of a vent.

4. The foamed polyester extrusion process according to claim 1, wherein said preheated nitrogen gas is introduced at a flow rate between 200 l/h and 1500 l/h measured when said nitrogen gas is at room temperature.

5. The foamed polyester extrusion process according to claim 1, wherein said foaming agent is nitrogen gas and is introduced in contact with said polyester material with a pressure kept stable at values from 8 bar to 40 bar.

6. The foamed polyester extrusion process according to claim 1, wherein said foaming agent is selected from the group consisting of:
   nitrogen gas,
   carbon dioxide,
   liquefied carbon dioxide,
   hexane,
   aliphatic hydrocarbons, and
   aromatic hydrocarbons.

7. The foamed polyester extrusion process according to claim 1, wherein said mixture of polyester material fed in said foamed polyester extrusion equipment has at least one of the following additives added to it:
   chain-extension and cross-linking agents,
   nucleating agents,
   stabilizing agents,
   coloring agents,
   antiflame agents and
   mineral fillers.

8. The foamed polyester extrusion process according to claim 1, further comprising the steps of:
   a) feeding the material to a gear pump in order to generate the pressure necessary for the final extrusion;
   b) extruding the polyester material by employing a layering device and an extruder head; and
   c) foaming the polyester material and forming the sheet by employing a calender chill roll stack.

9. The foamed polyester extrusion process according to claim 1, wherein said polyester material is selected from the group consisting of:
   PET,
   PET copolymers,
   PLA, and
   PLA copolymers.

10. The foamed polyester extrusion process according to claim 1, wherein said mixture of polyester material comprises at least one part of polyester material from post-consumption recycling.

* * * * *